(12) United States Patent
Yasuda et al.

(10) Patent No.: US 10,843,394 B2
(45) Date of Patent: Nov. 24, 2020

(54) INJECTION MOLDING MACHINE NOZZLE

(71) Applicant: HONDA MOTOR CO., LTD., Tokyo (JP)

(72) Inventors: Masahiro Yasuda, Tochigi (JP); Qinyao Jiang, Tochigi (JP); Tetsuro Hosaka, Tochigi (JP); Shunsuke Tsukada, Tochigi (JP); Yuji Kinoshita, Tochigi (JP)

(73) Assignee: HONDA MOTOR CO., LTD., Tokyo (JP)

(*) Notice: Subject to any disclaimer, the term of this patent is extended or adjusted under 35 U.S.C. 154(b) by 19 days.

(21) Appl. No.: 16/085,744

(22) PCT Filed: Jan. 24, 2017

(86) PCT No.: PCT/JP2017/002339
§ 371 (c)(1),
(2) Date: Sep. 17, 2018

(87) PCT Pub. No.: WO2017/159049
PCT Pub. Date: Sep. 21, 2017

(65) Prior Publication Data
US 2019/0039273 A1 Feb. 7, 2019

(30) Foreign Application Priority Data
Mar. 18, 2016 (JP) ................. 2016-056090

(51) Int. Cl.
*B29C 45/20* (2006.01)
*B29C 45/27* (2006.01)

(52) U.S. Cl.
CPC ............ *B29C 45/20* (2013.01); *B29C 45/278* (2013.01); *B29C 2045/202* (2013.01); *B29C 2045/207* (2013.01); *B29C 2045/2785* (2013.01)

(58) Field of Classification Search
CPC . B29C 45/20; B29C 45/278; B29C 2045/202; B29C 2045/207; B29C 2045/2785
See application file for complete search history.

(56) References Cited

U.S. PATENT DOCUMENTS 2,871,517 A * 2/1959 Allard ..................... B29C 45/22
425/570
5,028,227 A * 7/1991 Gellert ................ B29C 45/2711
264/328.15
(Continued)

FOREIGN PATENT DOCUMENTS

CN 104755246 7/2015
JP S490065761 6/1974
(Continued)

OTHER PUBLICATIONS

International Search Report, dated Mar. 28, 2017 (Mar. 28, 2017), 2 pages.
(Continued)

*Primary Examiner* — Xiao S Zhao
*Assistant Examiner* — Emmanuel S Luk
(74) *Attorney, Agent, or Firm* — Rankin, Hill & Clark LLP

(57) ABSTRACT

An injection molding machine nozzle capable of suppressing stringiness caused by unsolidified resin in the case where a mold is released in a short time and reducing a cycle time, is provided. An injection molding machine nozzle (10) includes a nozzle hole to eject molten resin from a hot runner (12). The injection molding machine nozzle (10) includes a nozzle tip (16) made of a material having higher heat conductivity than that of the hot runner (12) and including a nozzle hole (16B) communicating with a most downstream (Continued)

side of a resin flow path of the hot runner (12). The nozzle tip (16) is joined to the hot runner (12) through a heat insulation member (14).

4 Claims, 2 Drawing Sheets

(56) References Cited

U.S. PATENT DOCUMENTS

| | | | | |
|---|---|---|---|---|
| 5,268,184 A * | 12/1993 | Gellert | ................ | B29C 45/27 264/328.15 |
| 5,299,928 A * | 4/1994 | Gellert | ................ | B29C 45/278 264/328.15 |
| 5,879,727 A * | 3/1999 | Puri | ................ | B29C 45/27 264/328.15 |
| 6,666,675 B2 * | 12/2003 | Ihara | ................ | B29C 45/27 264/328.15 |
| 6,789,745 B1 * | 9/2004 | Babin | ................ | B29C 45/2711 239/128 |
| 7,559,760 B2 * | 7/2009 | Tabassi | ................ | B29C 45/27 425/549 |
| 10,384,384 B2 * | 8/2019 | Rossi | ................ | B29C 45/20 |
| 2002/0098262 A1 * | 7/2002 | Babin | ................ | B29C 45/2735 425/562 |
| 2004/0137107 A1 * | 7/2004 | Babin | ................ | B22D 17/2272 425/572 |
| 2004/0146598 A1 * | 7/2004 | Sicilia | ................ | B29C 45/2806 425/569 |
| 2004/0191354 A1 * | 9/2004 | Baresich | ................ | B29C 45/20 425/549 |
| 2004/0258788 A1 * | 12/2004 | Olaru | ................ | B29C 45/278 425/191 |
| 2005/0147713 A1 * | 7/2005 | Hagelstein | ................ | B29C 45/27 425/549 |
| 2006/0003041 A1 * | 1/2006 | Rosner | ................ | B29C 45/1603 425/130 |
| 2007/0264386 A1 * | 11/2007 | Guenther | ................ | B29C 45/278 425/549 |
| 2008/0206396 A1 * | 8/2008 | Bouti | ................ | B29C 45/278 425/549 |
| 2008/0241298 A1 * | 10/2008 | Fischer | ................ | B29C 45/278 425/143 |
| 2008/0274229 A1 * | 11/2008 | Barnett | ................ | B29C 45/27 425/568 |
| 2009/0148550 A1 * | 6/2009 | Mohammed | ................ | B29C 45/278 425/549 |
| 2010/0092601 A1 * | 4/2010 | Klobucar | ................ | B29C 45/278 425/548 |
| 2011/0117238 A1 * | 5/2011 | Gunther | ................ | B29C 45/278 425/569 |
| 2011/0129561 A1 * | 6/2011 | Adas | ................ | B29C 45/2806 425/564 |
| 2017/0015033 A1 * | 1/2017 | Rossi | ................ | B29C 45/278 |
| 2017/0043517 A1 * | 2/2017 | Rossi | ................ | B29C 45/20 |
| 2018/0099442 A1 * | 4/2018 | Fairy | ................ | B29C 45/278 |
| 2018/0290361 A1 * | 10/2018 | Gunther | ................ | B29C 45/278 |

FOREIGN PATENT DOCUMENTS

| | | |
|---|---|---|
| JP | S60-56521 | 4/1985 |
| JP | S62-134234 | 6/1987 |
| JP | H04-8519 | 1/1991 |
| JP | H06-190872 | 7/1994 |
| JP | H07-276431 | 10/1995 |
| JP | H09-123222 A | 5/1997 |
| JP | H09-239781 | 9/1997 |
| JP | H11-198181 A | 7/1999 |
| JP | 2001-246642 | 9/2001 |
| JP | 2002-225084 | 8/2002 |
| JP | 4335400 | 7/2009 |
| JP | 2012-111067 | 6/2012 |
| JP | 2014-079918 A | 5/2014 |

OTHER PUBLICATIONS

Indian Office Action dated Nov. 14, 2019, 5 pages.
Chinese Office Action dated Nov. 7, 2019, 5 pages.

\* cited by examiner

INJECTION MOLDING MACHINE NOZZLE

TECHNICAL FIELD

The present invention relates to an injection molding machine nozzle including a nozzle hole which ejects molten resin from a hot runner.

BACKGROUND ART

Conventionally, an injection molding machine nozzle is known in which a piece member is mounted on an upstream side of a nozzle hole, an opening is formed at a part of the piece member not opposing the nozzle hole and molten resin flows through the opening to the nozzle hole (for example, see Patent Literature 1). In the conventional nozzle, the nozzle hole is shielded from a resin flow path on the upstream side at a part of the piece member opposing the nozzle hole, and stringiness of the molten resin inside the resin flow path is suppressed when releasing the mold. However, there are problems that solidification of resin remaining between the nozzle hole and the piece member takes time, and the stringiness is generated from unsolidified resin remaining between the nozzle hole and the piece member when the mold is released at an early timing.

In order to solve the problems of the conventional nozzle described above, there has been proposed a nozzle formed with a projection projected toward the nozzle hole at the part of the piece member opposing the nozzle hole (for example, see Patent Literature 2). In such nozzle, the solidification of the resin remaining at the part between the nozzle hole and the piece member is accelerated by the projection of the piece member, the stringiness is hardly generated even when the mold is released at an early timing, and the problems described above are solved to a certain degree.

CITATION LIST

Patent Literature

Patent Literature 1: Japanese Patent Laid-Open No. 60-56521
Patent Literature 2: Japanese Patent No. 4335400

SUMMARY OF INVENTION

Technical Problem

However, even the nozzle described in Patent Literature 2 is not sufficient, since heat is not cut off between a hot runner and the nozzle hole and the heat of the hot runner is transmitted to the nozzle hole. Therefore, unsolidified resin sometimes remains depending on the mold release timing.

The present invention has been made in consideration of the conventional problems above, and provides an injection molding machine nozzle capable of suppressing stringiness by unsolidified resin in the case where a mold is released in a short time, and capable of reducing a cycle time.

Solution to Problem

An injection molding machine nozzle of the present invention is the injection molding machine nozzle including a nozzle hole which ejects molten resin from a hot runner, and comprises a nozzle tip made of a material having higher heat conductivity than that of the hot runner, and including a nozzle hole communicating with a most downstream side of a resin flow path of the hot runner, and the nozzle tip is joined to the hot runner through a heat insulation member.

In the injection molding machine nozzle of the present invention, since the hot runner and the nozzle tip are joined via the heat insulation member, heat from the hot runner is not easily transmitted to the nozzle tip. Furthermore, since the nozzle tip is made of a material having high heat conductivity, the heat is easily released to the outside. As a result, a temperature of the nozzle hole becomes lower compared to the hot runner and the molten resin inside the nozzle hole is solidified in a short time, so that stringiness by semi-solidified molten resin can be suppressed even in the case where a mold is released in a short time.

In the injection molding machine nozzle of the present invention, it is preferable to have a gap between the hot runner and the nozzle tip. By presence of the gap between the hot runner and the nozzle tip, conduction of the heat from the hot runner to the nozzle tip is cut off by the gap. Therefore, the conduction of the heat of the hot runner to the nozzle hole is suppressed, contributing to temperature reduction of the nozzle hole. Consequently, the resin inside the nozzle hole can be solidified in a short time.

In the injection molding machine nozzle of the present invention, as a form of having the gap between the hot runner and the nozzle tip, specifically, a counterbored hole communicating with the resin flow path is provided on a downstream side end of the hot runner, the nozzle tip includes a cylinder part having the nozzle hole, and a flange part joined to a bottom surface of the cylinder part and having an opening communicating with the nozzle hole, the heat insulation member includes a cylindrical body including an outer wall in contact with the counterbored hole of the hot runner and a through-hole in contact with an outer periphery of the cylinder part of the nozzle tip, the cylinder part of the nozzle tip is in contact with the through-hole of the heat insulation member, the outer wall of the heat insulation member is in contact with the counterbored hole of the hot runner, and the gap is provided at least either between the flange part of the nozzle tip and the downstream side end of the hot runner or between a distal end of the cylinder part of the nozzle tip and an innermost part of the counterbored hole of the hot runner.

In the injection molding machine of the present invention, it is preferable that the downstream side end of the resin flow path inside the hot runner is in a tapered shape tapered toward a part communicating with the nozzle hole. When a diameter of the resin flow path inside the hot runner is large near the nozzle tip, the molten resin stagnates at the part. In such state, when the resin to be used for molding is changed to resin of a different color, since the resin before the change and the resin after the change mix with each other, the stagnating resin needs to be removed. Then, by making the vicinity of the nozzle hole of the resin flow path inside the hot runner to have a tapered shape, the stagnation of the resin described above can be suppressed. As a result, even in the case where the resin to be used for molding is changed to the resin of a different color, resin removal work can be simplified.

In the injection molding machine nozzle of the present invention, it is preferable to include a piece member on an upstream side of the nozzle hole comprising an opening where molten resin from the hot runner is distributed, a shield part which shields the molten resin, and a projection part projected from the shield part toward a downstream side of the nozzle hole. By the shield part of the piece member, the molten resin from the resin flow path of the hot runner is shielded, and the stringiness at the time of mold release can be suppressed. In addition, by the projection part of the piece member, solidification of the molten resin remaining between the nozzle hole and the piece member is accelerated, and the stringiness can be suppressed.

In addition, it is preferable that the shield part of the piece member is in a three-dimensional shape that a width is widened from the resin flow path of the hot runner toward the nozzle hole of the nozzle tip. While the resin is cut off in the vicinity of the shield part at the time of mold release when the piece member is provided, when the shape of the shield part is a three-dimensional shape as described above, heat dissipation is improved at a wider part on the cross section and a cut-off part is generated at the wide part, that is, the part on the downstream side, so that it is assumed that a cut-off position is on a more downstream side. Furthermore, since a temperature of the molten resin inside the nozzle hole is lower on the downstream side, the solidification is advanced more on the downstream side. Thus, by forming the shield part of the piece member to have a three-dimensional shape as described above, the cut-off position can be made more on the downstream side, and the stringiness at the time of mold release can be suppressed.

DESCRIPTION OF EMBODIMENT

Hereinafter, an embodiment of the injection molding machine nozzle of the present invention will be described in detail with reference to the attached drawings.

Figure 1:
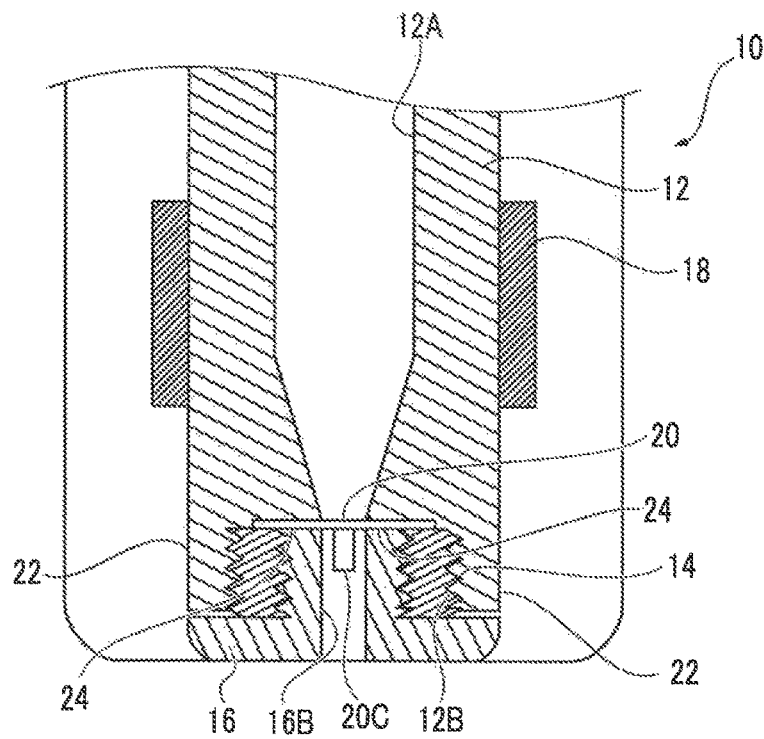
FIG. 1 is a sectional view of an injection molding machine nozzle of a present embodiment.

As illustrated in FIG. 1, an injection molding machine nozzle 10 of the present embodiment includes a hot runner 12, a heat insulation member 14, and a nozzle tip 16. At the hot runner 12, a counterbored hole 12B communicating with a resin flow path 12A is formed at a downstream side end, the heat insulation member 14 and the nozzle tip 16 are positioned inside the counterbored hole 12B, and the nozzle tip 16 is joined to the hot runner 12 through the heat insulation member 14. In addition, a heater 18 which heats the resin flow path is provided outside the hot runner 12, and while the molten resin inside the hot runner 12 is heated so as not to be solidified, the molten resin is guided to the nozzle tip. Details of the respective members will be described below.

The hot runner 12 is a cylindrical body 22 inside which the resin flow path 12A and the counterbored hole 12B communicating with the resin flow path 12A are formed. In injection molding, the molten resin from a screw not illustrated flows from an upper part of the resin flow path 12A into the hot runner 12, and flows toward a nozzle hole 16B of the nozzle tip 16 communicating with the most downstream side of the resin flow path 12A. At the time, in order to prevent solidification of the molten resin passing through the resin flow path 12A due to temperature decline, the hot runner 12 is heated by the heater 18. Then, in the injection molding, the molten resin is ejected from a distal end of the nozzle hole 16B, and flows into a cavity inside a mold not illustrated.

The resin flow path 12A inside the hot runner 12 is in a tapered shape tapered toward a part communicating with the nozzle hole 16B in the vicinity of the downstream side end. By the vicinity of the downstream side end of the resin flow path 12A being in such a tapered shape, a situation that the molten resin stagnates inside the resin flow path 12A can be prevented. As a result, even in the case where the resin to be used for molding is to be changed to the resin of a different color, since the resin before the change and the resin after the change do not mix with each other, resin removal work can be simplified.

Figure 2:
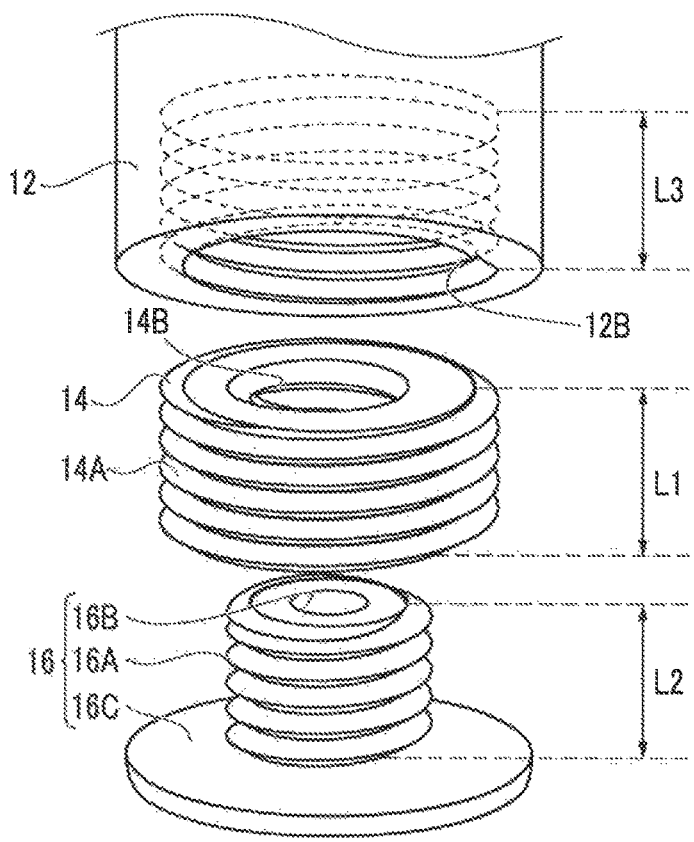
FIG. 2 is an illustration diagram of a state before joining each of a hot runner, a heat insulation member and a nozzle tip of the injection molding machine nozzle illustrated in FIG. 1.
Figure 3:
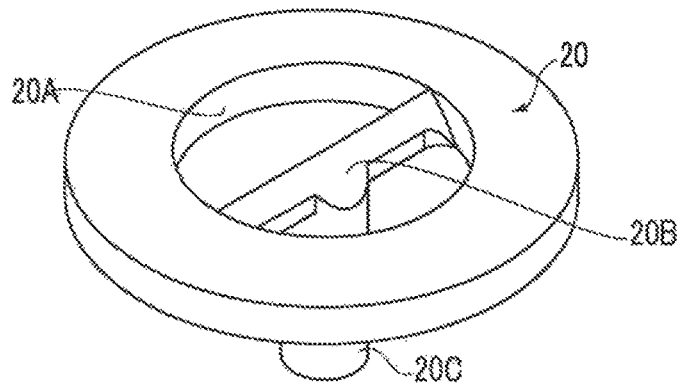
FIG. 3 is a perspective view of a piece member of the present embodiment.

On an inner wall of the counterbored hole 12B of the hot runner 12, as illustrated in FIG. 2, a female screw to be screwed with a male screw formed on an outer wall 14A of the heat insulation member 14 to be described later, is formed.

The heat insulation member 14 is made of a heat insulation material, and as illustrated in FIG. 2, includes a cylindrical body including the outer wall 14A in contact with the counterbored hole 12B of the hot runner 12 and a through-hole 14B in contact with an outer periphery of a cylinder part 16A of the nozzle tip 16. The male screw is formed on the outer wall 14A, and a female screw is formed in the through-hole 14B.

As the heat insulation material configuring the heat insulation member 14, for example, stainless steel or ceramics can be used.

The nozzle tip 16 includes, as illustrated in FIG. 2, the cylinder part 16A having the nozzle hole 16B, and a flange part 16C joined to a bottom surface of the cylinder part 16A and having an opening communicating with the nozzle hole 16B, and a male screw is formed on an outer side of the cylinder part 16A. In addition, the nozzle tip 16 is made of a material having higher heat conductivity than that of the hot runner 12. For example, in the case where a material configuring the hot runner 12 is carbon steel such as S50C, beryllium copper, copper, aluminum or the like can be used as the material configuring the nozzle tip 16.

The injection molding machine nozzle 10 of the present embodiment is formed by screwing the male screw of the outer wall 14A of the heat insulation member 14 with the female screw of the counterbored hole 12B of the hot runner 12 and screwing the male screw of the cylinder part 16A of the nozzle tip 16 with the female screw of the through-hole 14B of the heat insulation member 14, thereby joining the members. That is, the nozzle tip 16 is joined with the hot runner 12 through the heat insulation member 14.

The flange part 16C of the nozzle tip 16 is not in contact with the downstream side end of the hot runner 12 and has a gap. Similarly, a distal end of the cylinder part 16A of the nozzle tip 16 is not in contact with an innermost part inside the counterbored hole 12B of the hot runner 12, and has a gap. These will be described with reference to FIG. 2. As illustrated in FIG. 2, when a length of the outer wall 14A of the heat insulation member 14 (=the length of the through-hole 14B) is defined as L1, the length of the cylinder part 16A of the nozzle tip 16 is defined as L2, and a depth of the counterbored hole 12B inside the hot runner 12 is defined as L3, they are set to be L1>L2(=L3). Thus, since the length L1 of the outer wall 14A of the heat insulation member 14 is longer than the depth L3 of the counterbored hole 12B inside the hot runner 12, the flange part 16C of the nozzle tip 16 is not brought into contact with the downstream side distal end of the hot runner 12, and has the gap. In addition, since the length L1 of the through-hole 14B of the heat insulation member 14 is longer than the length L2 of the cylinder part 16A of the nozzle tip 16, the distal end of the cylinder part 16A of the nozzle tip 16 and the innermost part inside the counterbored hole 12B of the hot runner 12 are not brought into contact and have the gap. Then, by the gaps, conduction of heat from the hot runner 12 to the nozzle tip 16 is cut off. Of course, when the gap is present between the distal end of the cylinder part 16A of the nozzle tip 16 and the innermost part inside the counterbored hole 12B of the hot runner 12, the molten resin fills the gap and is solidified at the first resin molding and the resin remains even thereafter, so that the remaining resin achieves a role of cutting off transmission of the heat. Moreover, the gap at the two parts may be formed only at either one part.

On an upstream side of the nozzle tip 16 (the downstream side end of the resin flow path 12A of the hot runner 12), a piece member 20 comprising an opening 20A where the molten resin from the hot runner 12 is distributed, a shield part 20B which shields the molten resin, and a projection part 20C projected from the shield part 20B (from a lower surface 24 of the piece member 20) toward the downstream side of the nozzle hole 16B is provided. By the shield part 20B of the piece member 20, the molten resin from the resin flow path 12A of the hot runner 12 is shielded, and the stringiness at mold release can be suppressed. In addition, by the projection part 20C, the solidification of the molten resin remaining between the nozzle hole 16B and the piece member 20 is accelerated, and the stringiness can be suppressed.

Figure 4A:
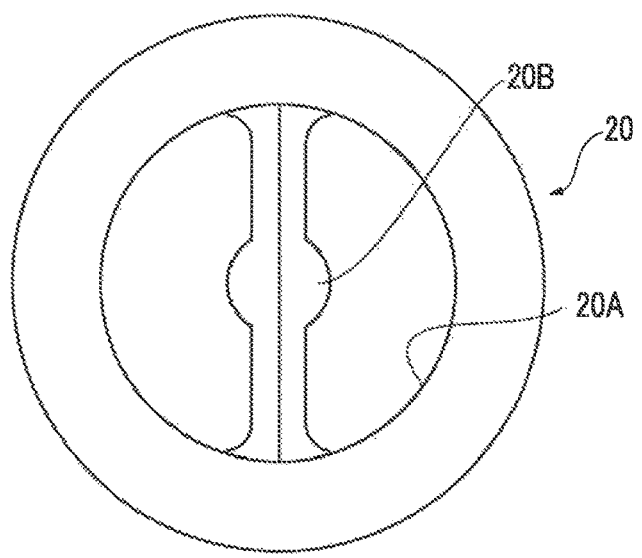
FIG. 4A is a top view of the piece member illustrated in FIG. 3.
Figure 4B:
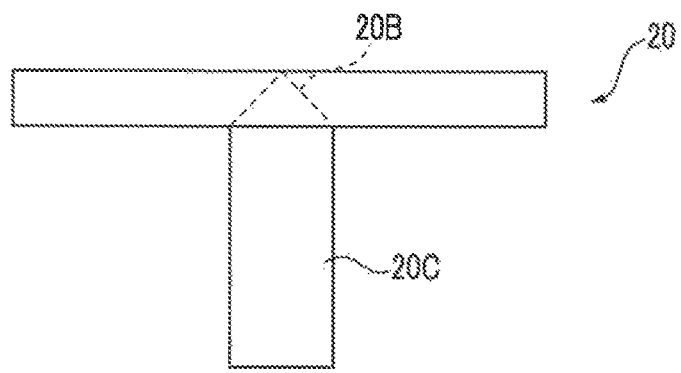
FIG. 4B is a side view of the piece member illustrated in FIG. 3.

The shield part 20B of the piece member 20 is, as illustrated in FIG. 4, in a wedge shape (three-dimensional shape) in which a width is widened from the resin flow path 121 of the hot runner 12 toward the nozzle hole 16B of the nozzle tip 16. While the resin is cut off in the vicinity of the shield part 20B at the time of mold release when the piece member 20 is provided, when the shape of the shield part is the wedge shape, heat dissipation is improved at a wider part on a cross section of the wedge shape and a cut-off part is generated at the wide part, that is, the part on the downstream side, so that it is estimated that a cut-off position is on a more downstream side. Furthermore, since a temperature of the molten resin inside the nozzle hole is lower on the downstream side, the solidification is advanced more on the downstream side. Thus, by forming the shield part of the piece member as the three-dimensional shape as described above, the cut-off position can be made to be more on the downstream side, and the stringiness at the time of mold release can be suppressed. Moreover, the shape of the shield part may be a shape other than the wedge shape as long as the upstream side is tapered off.

In the above-described configuration, at molding, the molten resin inside the resin flow path 12A of the hot runner 12 is in a molten state since it is heated by the heater 18. In the meantime, since the nozzle tip 16 is made of the material having a high heat conductivity, heat easily escapes. In addition, since the hot runner 12 and the nozzle tip 16 are joined through the heat insulation member 14, the heat of the hot runner 12 is not easily transmitted to the nozzle tip 16. Thus, in the nozzle hole 16B of the nozzle tip 16, the temperature of the molten resin becomes low, and consequently the resin is solidified in a short time.

Further, the piece member 20 provided between the hot runner 12 and the nozzle tip 16 contributes to accelerating the solidification of the molten resin remaining between the nozzle hole 16B and the piece member 20 and suppressing the stringiness at the time of mold release. Thus, by providing the piece member 20, combined with a temperature gradient to the lower temperature from the resin flow path 12A of the hot runner 12 toward the nozzle hole 16B of the nozzle tip 16, the stringiness at the time of mold release can be more effectively suppressed. Consequently, a mold can be released in a short time, and the cycle time can be reduced.

REFERENCE SIGNS LIST

10 . . . injection molding machine nozzle, 12 . . . hot runner, 14 heat insulation member, 16 . . . nozzle tip, 18 . . . heater, 20 . . . piece member.

The invention claimed is:

1. An injection molding machine nozzle comprising a nozzle tip, a hot runner, and a heat insulation member, wherein
the nozzle tip includes a nozzle hole communicating with a most downstream side of a resin flow path of the hot runner and ejects molten resin from the hot runner,
the nozzle tip is made of a material having higher heat conductivity than heat conductivity of the hot runner,
the nozzle tip is joined to the hot runner through the heat insulation member,
among the hot runner and the nozzle tip, only the hot runner is provided with a heater,
a counterbored hole communicating with the resin flow path is defined on a downstream side end of the hot runner,
the nozzle tip includes a cylinder part having the nozzle hole, and a flange part joined to a bottom surface of the cylinder part and having an opening communicating with the nozzle hole,
the heat insulation member is composed of a cylindrical body including an outer wall in contact with the counterbored hole of the hot runner and a through-hole in contact with an outer periphery of the cylinder part of the nozzle tip,
a first gap is provided between the flange part of the nozzle tip and the downstream side end of the hot runner, and
a second gap capable of being filled with the molten resin is provided between a distal end of the cylinder part of the nozzle tip and an innermost part inside the counterbored hole of the hot runner.

2. The injection molding machine nozzle according to claim 1, wherein a downstream side end of the resin flow path inside the hot runner is in a tapered shape tapered toward a part communicating with the nozzle hole.

3. The injection molding machine nozzle according to claim 1, including a piece member, on an upstream side of the nozzle hole, comprising an opening where molten resin from the hot runner is distributed, a shield part which shields the molten resin, and a projection part projected from the shield part toward a downstream side of the nozzle hole.

4. The injection molding machine nozzle according to claim 3, wherein the shield part of the piece member is in a three-dimensional shape that a width is widened from the resin flow path of the hot runner toward the nozzle hole of the nozzle tip.

\* \* \* \* \*